United States Patent
Seki et al.

(10) Patent No.: US 6,473,451 B1
(45) Date of Patent: Oct. 29, 2002

(54) SIGNAL TO INTERFERENCE POWER RATIO MEASURING APPARATUS AND SIGNAL TO INTERFERENCE POWER RATIO MEASURING METHOD AS WELL AS TRANSMISSION POWER CONTROLLING METHOD UNDER CDMA COMMUNICATION SYSTEM

(75) Inventors: Hiroyuki Seki, Kawasaki (JP);
Yoshinori Tanaka, Kawasaki (JP);
Shuji Kobayakawa, Kawasaki (JP);
Takeshi Toda, Kawasaki (JP);
Masafumi Tsutsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/477,187

(22) Filed: Jan. 4, 2000

Related U.S. Application Data

(62) Division of application No. 09/026,322, filed on Feb. 19, 1998.

(30) Foreign Application Priority Data

Mar. 5, 1997 (JP) .............................................. 9-050288

(51) Int. Cl.$^7$ .............................................. H04L 27/30
(52) U.S. Cl. ........................ 375/142; 375/144; 375/148; 375/150; 375/343; 375/349; 370/335; 370/342; 455/63; 455/67.3; 455/226.3
(58) Field of Search ................................. 375/130, 141, 375/142, 144, 148, 150, 343, 349; 370/335, 342; 455/63, 67.3, 67.1, 226.2, 226.3

(56) References Cited

U.S. PATENT DOCUMENTS

| | | | |
|---|---|---|---|
| 4,124,818 A | 11/1978 | Lin et al. | |
| 4,992,798 A | 2/1991 | Nozuo et al. | |
| 5,418,814 A | 5/1995 | Hulbert | |
| 5,467,368 A | 11/1995 | Takeuchi et al. | |
| 5,566,165 A | 10/1996 | Sawahashi et al. | |
| 5,596,600 A | 1/1997 | Dimos et al. | |
| 5,724,378 A | * 3/1998 | Miki et al. | 375/200 |
| 5,956,333 A | * 9/1999 | Zhou et al. | 370/342 |
| 6,032,026 A | * 2/2000 | Seki et al. | 455/63 |
| 6,088,383 A | * 7/2000 | Suzuki et al. | 375/148 |
| 6,229,857 B1 | * 5/2001 | Wagner et al. | 375/316 |

FOREIGN PATENT DOCUMENTS

| | | |
|---|---|---|
| EP | 0 776 105 A1 | 5/1997 |
| EP | 0 798 873 A2 | 10/1997 |
| EP | 0 823 796 A2 | 2/1998 |
| WO | WO 95/34140 | 12/1995 |

* cited by examiner

Primary Examiner—Stephen Chin
Assistant Examiner—Dac V. Ha
(74) Attorney, Agent, or Firm—Katten Muchin Zavis Rosenman

(57) ABSTRACT

The invention provides a technique for measurement of a signal to interference power ratio wherein an SIR can be measured with a higher degree of accuracy without being influenced by a fast fading environment or an inter-station interference or noise environment. A signal to interference power ratio measuring apparatus includes a plurality of interference replica signal production sections for performing de-spread processing for input signals originating from a received signal, performing temporary decision of information symbols regarding the input signals, performing spread processing again for the input signals and outputting resulting signals as interference replica signals, a plurality of subtractors for subtracting the interference replica signals from the received signal, an interference power detection section for detecting interference power information, a signal power detection section for detecting signal power information, and a signal to interference power ratio calculation section for calculating signal to interference power ratios from the interference power information and the signal power information.

4 Claims, 10 Drawing Sheets

FIG. 4

| SHORT CODE | 64 PERIOD ORTHOGONAL GOLD |
|---|---|
| MODULATION (DATA, SPREADING) | QPSK |
| CHANNEL MODEL | FPLMTS VEHICULAR B MODEL (6 PATH) |
| DIVERSITY | 4 FINGER RAKE, 2 BRANCH SPACE |
| ERROR CORRECTION | CONVOLUTION CODE (R=1/3, K=7) SOFT DECISION VITERBI DECODING |

SIGNAL TO INTERFERENCE POWER RATIO MEASURING APPARATUS AND SIGNAL TO INTERFERENCE POWER RATIO MEASURING METHOD AS WELL AS TRANSMISSION POWER CONTROLLING METHOD UNDER CDMA COMMUNICATION SYSTEM

This application is a division of Ser. No. 09/026,322, filed Feb. 19, 1998, allowed Sep. 27, 1999.

BACKGROUND OF THE INVENTION

1. Field of the Invention

This invention relates to a signal to interference power ratio measuring apparatus and a signal to interference power ratio measuring method as well as a transmission power controlling method under a CDMA communication system suitable for use to effect transmission power control of, for example, a mobile radio communication apparatus, particularly a mobile radio communication apparatus, which adopts CDMA (Code Division Multiple Access) which employs a multiple access method.

2. Description of the Related Art

In recent years, attention is paid to, from among transmission systems for use for radio communication, a code division multiple access (CDMA) system which is a multiple access system which makes use of a spread spectrum and exhibits a high frequency utilization efficiency. Particularly, in cellular DS/CDMA (Direct Sequence/Code Division Multiple Access) mobile communication, in order to increase the subscriber capacity while maintaining a required line quality, transmission power control which solves the remote/near problem is an important technique.

FIG. 9 shows a radio communication system to which an ordinary DS/CDMA communication system is applied. Referring to FIG. 9, the radio communication system 100 shown includes a base station 101 and a plurality of terminal stations (mobile stations) 102-1 to 102-n (n is a natural number equal to or greater than 2) so that information such as speech or data is transmitted from the single base station 101 to the plurality of terminal stations 102-1 to 102-n or vice versa.

More particularly, since the CDMA system multiplexes information using codes in order to transmit the information from the base station 101 to the plurality of terminal stations 102-1 to 102-n in FIG. 9, signals destined for all of the terminal stations 102-1 to 102-n can be transmitted at the same time with the same frequency.

One of methods for realizing the transmission power control described above in the radio communication system shown in FIG. 9 is closed loop transmission power control wherein signal to interference power ratios (SIRs) of received signals from the terminal stations 102-1 to 102-n are measured by the base station 101 and the transmission powers of the terminal stations 102-1 to 102-n are controlled so that the values thereof may be kept fixed.

Generally, as a signal to interference power ratio measuring method, a method is known wherein an average received power after RAKE composition (delayed wave composition) is regarded as a received power (S) and a diffusion of the received power is calculated as an interference power (I). It is to be noted that the RAKE composition mentioned above is performed for delayed waves as a plurality of received waves having different delay times after they are synchronized with one another and then de-spread processing and transmission line channel estimation processing are performed.

FIG. 10 shows an SIR measuring apparatus which measures a signal to interference power ratio (SIR) using the technique described above. Referring to FIG. 10, the SIR measuring apparatus 80 shown includes a quadrant detection section 80A, a vector mean calculation section 80B, a square calculation section 80C, a mean square calculation section 80D, a subtraction section 80E, and an SIR calculation section 80F.

The quadrant detection section 80A detects a quadrant of a received signal vector after RAKE composition. In particular, the quadrant detection section 80A effects degeneracy of the received signal vector to a single quadrant by calculating absolute values of an in-phase component and an orthogonal component of the received signal vector individually and so forth.

The vector mean calculation section 80B calculates a vector mean of an output of the quadrant detection section 80A, and the square calculation section 80C calculates a received power (S) from the vector mean value from the vector mean calculation section 80B. The calculated received value (S) is outputted to the SIR calculation section 80F which is described below.

The mean square calculation section 80D calculates a mean square of the received signal after RAKE composition inputted thereto. The subtraction section 80E subtracts an output of the square calculation section 80C from an output of the mean square calculation section 80D to calculate a diffusion of the received signal. An output of the subtraction section 80E is used as an interference power (I).

The SIR calculation section 80F calculates an SIR (S/I ratio) based on an output (S: received power) of the square calculation section 80C and an output (I: interference power) of the subtraction section 80E. In this manner, in the SIR measuring apparatus 80 shown in FIG. 10, an SIR is calculated using a mean value of a received signal vector after RAKE composition calculated by the vector mean calculation section 80B for both of a received power and an interference power.

With the SIR measuring technique described above, however, the SIR measurement accuracy sometimes exhibits a deterioration under a fast fading environment or under an inter-station interference and noise environment. Therefore, the SIR measurement technique has a subject to be solved in that, where transmission power control is performed based on an SIR measured under such a circumstance as just described, such deterioration of the SIR measurement accuracy resultantly has an influence also upon the accuracy in transmission power control itself.

One of causes which deteriorate the accuracy in SIR measurement resides in that a mean value of a received signal vector is used for both of a received power (S) and an interference power (I). The received signal power is unstable because it is varied by a large amount by noise or by an estimation accuracy degree of a transmission line channel. Therefore, in order to assure a high degree of accuracy, it is necessary to calculate a mean value over a long period.

Further, since also use of a value in a data symbol interval in which the transmission line channel is not settled results in deterioration in accuracy, such a contrivance as to estimate a transmission line channel with a high degree of accuracy and to use, in order to assure a high degree of accuracy in SIR measurement, only a value within a pilot symbol interval is required.

Generally, a pilot symbol is arranged at a leading end and a trailing end of a slot across a plurality of data symbols, and in order to estimate a transmission line channel with a high degree of accuracy, a plurality of pilot symbols are used.

Accordingly, also in this instance, measurement of an SIR must be performed over a long interval (many slots) including at least two pilot symbol intervals between which a plurality of data symbols are held, and this is not suitable for an application in a fast fading environment. As a result, also a delay not only in SIR measurement but also in transmission power control is increased, and by such delay in transmission power control, the control error is increased and also the reception characteristic is deteriorated considerably.

Meanwhile, in the DS/CDMA communication system described above, also an application of an interference canceller which reduces interference from another user, which arises from a cross-correlation between spreading codes, is an important technique.

SUMMARY OF THE INVENTION

It is an object of the present invention to provide a signal to interference power ratio measuring apparatus and a signal to interference radio measuring method wherein a signal produced by an interference canceller is utilized so that an SIR can be measured with a higher degree of accuracy without being influenced by a fast fading environment or an inter-station interference or noise environment.

It is another object of the present invention to provide a transmission power controlling method under a CDMA communication system which can effect transmission power control with a high degree of accuracy even in a fast fading environment or an inter-station interference or noise environment.

In order to attain the object described above, according to an aspect of the present invention, there is provided a signal to interference power ratio measuring apparatus for an apparatus which processes a received signal received based on a CDMA communication system, comprising a plurality of interference replica signal production sections for performing de-spread processing for input signals originating from the received signal, performing temporary decision of information symbols regarding the input signals, performing spread processing again for the input signals after the temporary decision and outputting resulting signals of the spread processing as interference replica signals, a plurality of subtractors for subtracting the interference replica signals produced by the interference replica signal production sections from the received signal, an interference power detection section for detecting interference power information from outputs of the subtractors, a signal power detection section for detecting signal power information based on the signals which originate from the received signal and for which the de-spread processing has been performed, and a signal to interference power ratio calculation section for calculating signal to interference power ratios from the interference power information detected by the interference power detection section and the signal power information detected by the signal power detection section.

With the signal to interference power ratio measuring apparatus, since interference power information is detected based on signals obtained by subtracting, from a received signal, interference replica signals produced by an interference canceller for removing interference between spreading codes while signal power information is detected based on signals obtained by performing de-spread processing for signals originating from the received signal and consequently the interference power information and the signal power information can be detected separately from each other, there is an advantage that the accuracy in measurement of an SIR can be improved.

The signal to interference power ratio measuring apparatus may be constructed such that the signal power detection section detects signal power information based on signals which are obtained in an intermediate processing stage of the interference replica signal production sections and for which de-spread processing has been performed.

With the signal to interference power ratio measuring apparatus, since signal power information can be detected based on signals, for which de-spread processing has been performed, obtained in an intermediate processing stage of the interference replica signal production section, even if a data symbol interval is used for SIR measurement, a significant deterioration in accuracy does not occur, and even in a fast fading environment, a high degree of accuracy in measurement of an SIR can be maintained. Accordingly, SIR measurement can be performed with a reduced amount of delay, and as a result, the transmission power control can follow up such a fast fading environment as described above.

As an alternative, the signal to interference power ratio measuring apparatus may be constructed such that the signal power detection section detects signal power information based on signals obtained by de-spread processing for the outputs of the subtractors.

With the signal to interference power ratio measuring apparatus, since signal power information and interference power information can be separated with certainty from a received signal by repeating processing of detecting signals of all users from the received signal and subtracting all of the thus produced interference replica signals from the received signal, the SIR measurement accuracy can be improved remarkably, and consequently, the accuracy in transmission power control for the mobile stations can be improved remarkably.

According to another aspect of the present invention, there is provided a signal to interference power ratio measuring apparatus for a base station which processes a received signal received based on a CDMA communication system, comprising a plurality of interference replica signal production sections provided in tandem for performing de-spread processing for input signals originating from the received signal, performing temporary decision of information symbols regarding the input signals, performing spread processing again for the input signals after the temporary decision and outputting resulting signals of the spread processing as interference replica signals, a plurality of subtractors each provided on the output side of a corresponding one of the interference replica signal production sections for subtracting the interference replica signals produced by the interference replica signal production sections from the received signal for which delaying processing has been performed, an interference power detection section for detecting interference power information from outputs of the subtractors, a signal power detection section for detecting signal power information based on signals which are obtained in an intermediate processing stage of an arbitrary one of the interference replica signal production sections and for which the de-spread processing has been performed, and a signal to interference power ratio calculation section for calculating signal to interference power ratios from the interference power information detected by the interference power detection section and the signal power information detected by the signal power detection section.

With the signal to interference power ratio measuring apparatus, since interference power information is detected based on signals obtained by subtracting, from a received signal, interference replica signals produced by an interference canceller for removing interference between spreading codes while signal power information is detected based on signals obtained by performing de-spread processing for signals originating from the received signal and consequently the interference power information and the signal power information can be detected separately from each other, there is an advantage that the accuracy in measurement of an SIR can be improved.

According to a further aspect of the present invention, there is provided a signal to interference power ratio measuring apparatus for a base station which processes a received signal received based on a CDMA communication system, comprising a plurality of interference replica signal production sections provided in tandem for performing de-spread processing for input signals originating from the received signal, performing temporary decision of information symbols regarding the input signals, performing spread processing again for the input signals after the temporary decision and outputting resulting signals of the spread processing as interference replica signals, a plurality of subtractors each provided on the output side of a corresponding one of the interference replica signal production sections for subtracting the interference replica signals produced by the interference replica signal production sections from the received signal for which delaying processing has been performed, a reception section for receiving an output of one of the subtractors in the last stage as an input signal thereto and performing de-spread processing for the input signal, an interference power detection section for detecting interference power information from the output of the one of the subtractors in the last stage, a signal power detection section for detecting signal power information based on the signal obtained by the reception section, and a signal to interference power ratio calculation section for calculating signal to interference power ratios from the interference power information detected by the interference power detection section and the signal power information detected by the signal power detection section.

With the signal to interference power ratio measuring apparatus, since signal power information and interference power information can be separated with certainty from a received signal by repeating processing of detecting signals of all users from the received signal and subtracting all of the thus produced interference replica signals from the received signal, the SIR measurement accuracy can be improved remarkably, and consequently, the accuracy in transmission power control for the mobile stations can be improved remarkably.

According to a still further aspect of the present invention, there is provided a signal to interference power ratio measuring method for an apparatus which processes a received signal received based on a CDMA communication system, comprising the steps of detecting interference power information based on signals obtained by subtracting, from the received signal, interference replica signals produced by an interference canceller for removing interference between spreading codes, detecting signal power information based on signals obtained by performing de-spread processing for signals originating from the received signal, and calculating signal to interference power ratios from the interference power information and the signal power information.

With the signal to interference power ratio measuring method, since interference power information is detected based on signals obtained by subtracting, from a received signal, interference replica signals produced by an interference canceller for removing interference between spreading codes while signal power information is detected based on signals obtained by performing de-spread processing for signals originating from the received signal and consequently the interference power information and the signal power information can be detected separately from each other, there is an advantage that the accuracy in measurement of an SIR can be improved.

According to a yet further aspect of the present invention, there is provided a transmission power controlling method for a CDMA communication system used for communication between a base station and a plurality of mobile stations, comprising the steps performed by the base station of detecting interference power information based on signals obtained by subtracting, from a received signal received by the base station, interference replica signals produced by an interference canceller for removing interference between spreading codes, detecting signal power information based on signals obtained by performing de-spread processing for signals originating from the received signal, calculating signal to interference power ratios from the interference power information and the signal power information, and controlling transmission powers of the base stations so that the signal to interference power ratios may have a predetermined value.

With the transmission power controlling method for a CDMA communication system, since the accuracy of SIR values is improved by calculating the SIR values from interference power information and signal power information obtained from outputs of the interference canceller, there is an advantage that the transmission powers of the mobile stations can be controlled using the SIR values and, also in a noise environment or an inter-station interference condition when a large number of users communicate at a time, improvement in transmission power control characteristic can be achieved while maintaining a necessary line quality.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 4 is a diagram illustrating a concrete example of various elements used in a simulation performed by the signal to interference power ratio measuring apparatus shown in FIG. 1;

DESCRIPTION OF THE PREFERRED EMBODIMENTS a. First Embodiment of the Invention

Figure 1:
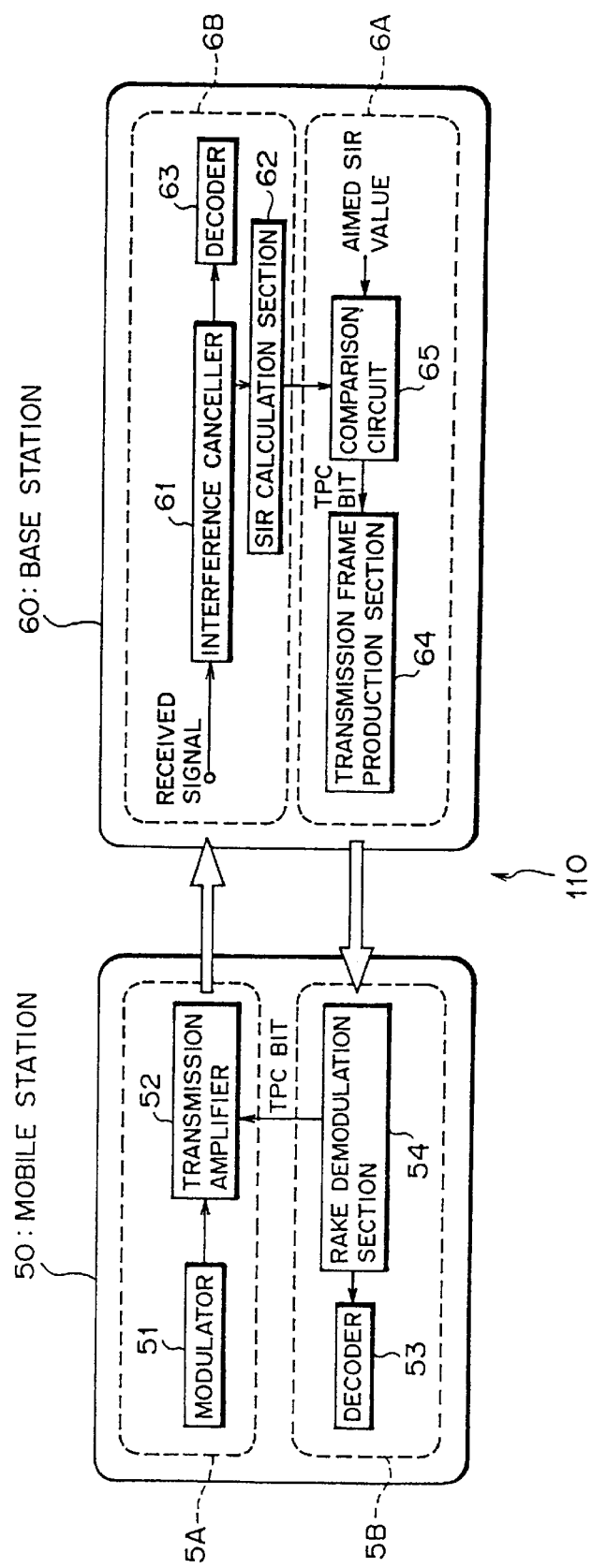
FIG. 1 is a block diagram showing a construction of a radio communication system to which a signal to interference power ratio measuring apparatus according to a first preferred embodiment of the present invention is applied.

Referring first to FIG. 1, there is shown in block diagram a construction of a radio communication system to which a signal to interference power ratio measuring apparatus according to a first preferred embodiment of the present invention is applied. The radio communication system 110 shown applies a DS/CDMA communication system and includes a mobile station 50 provided for each user and a base station 60 which can accommodate a plurality of such mobile stations 50 through radio lines.

The base station 60 includes an interference canceller 61 and an SIR calculation section 62 which form the signal to interference power ratio measuring apparatus 20 according to the first embodiment. The base station 60 further includes a decoder 63, a transmission frame production section 64 and a comparison circuit 65.

The interference canceller 61 has a function of removing interference between spreading codes which arises when mobile stations are out of synchronism with each other and another function of measuring interference powers (I) and received powers (S) which will be hereinafter described.

The SIR calculation section (signal to interference power ratio calculation section) 62 calculates signal to interference power ratios (SIR) from interference powers and received powers calculated by the interference canceller 61 described above. Meanwhile, the decoder 63 decodes a signal which has been processed by the interference canceller 61. It is to be noted that the interference canceller 61, SIR calculation section 62 and decoder 63 form a reception section 6B which receives signals from the mobile stations 50.

The comparison circuit 65 compares an SIR value of each user measured by the SIR calculation section 62 with an aimed SIR value set in advance and outputs a result of the comparison as a transmission power control bit (TPC bit).

The transmission frame production section 64 inserts the TPC bit from the comparison circuit 65 into a slot of a transmission frame for each user to produce a transmission frame for the user, and the transmission frames thus produced are transmitted from the base station 60 to the mobile stations 50 (individual users). It is to be noted that the transmission frame production section 64 and comparison circuit 65 form a transmission section 6A which transmits signals from the base station 60 to the mobile stations 50.

Each of the mobile stations (terminal stations) 50 includes a modulator 51, a transmission amplifier 52, a decoder 53 and a RAKE demodulation section 54. The modulator 51 performs modulation processing for data in the mobile station 50. The transmission amplifier 52 amplifies and outputs an output of the modulator 51 to the base station 60 and is adjusted by the RAKE demodulation section 54 described below. It is to be noted that the modulator 51 and transmission amplifier 52 form a transmission section 5A which transmits a signal from the mobile station 50 to the base station 60.

The RAKE demodulation section 54 receives a transmission frame outputted from the base station 60 as a reception frame and decodes a TPC bit included in the reception frame, and adjusts amplification processing of a signal by the transmission amplifier 52 based on the decoded TPC bit.

The decoder 53 decodes a signal from the RAKE demodulation section 54. It is to be noted that the decoder 53 and RAKE demodulation section 54 construct a reception section 5B.

In this manner, the radio communication system 110 performs transmission power control using SIR values obtained based on output values (interference powers (I) and received powers (S)) of the interference canceller 61.

In the radio communication system 110 shown in FIG. 1 and having the construction described above, SIR values of the individual users measured by the interference canceller 61 are compared with an aimed SIR value by the comparison circuit 65, and results of the comparison are inserted as transmission power bits (TPC bits) into slots of transmission frames for the individual users and transmitted from the base station 60 to the mobile stations 50.

Then, in each of the mobile stations 50 disposed for the individual users, a transmission frame from the base station 60 is received as a received frame and a TPC bit included in the received frame is decoded by the RAKE demodulation section 54, and a result of the decoding is outputted to the transmission amplifier 52. The transmission amplifier 52 adjusts the output thereof in response to the TPC bit from the RAKE demodulation section 54.

In particular, a transmission signal from the modulator 51 is amplified with a desired amplification factor and transmitted to the base station 60. Consequently, received SIR values of all of the users can be controlled from the base station 60 side so that they may be equal to the aimed SIR value, and a required line quality is maintained.

Figure 2:
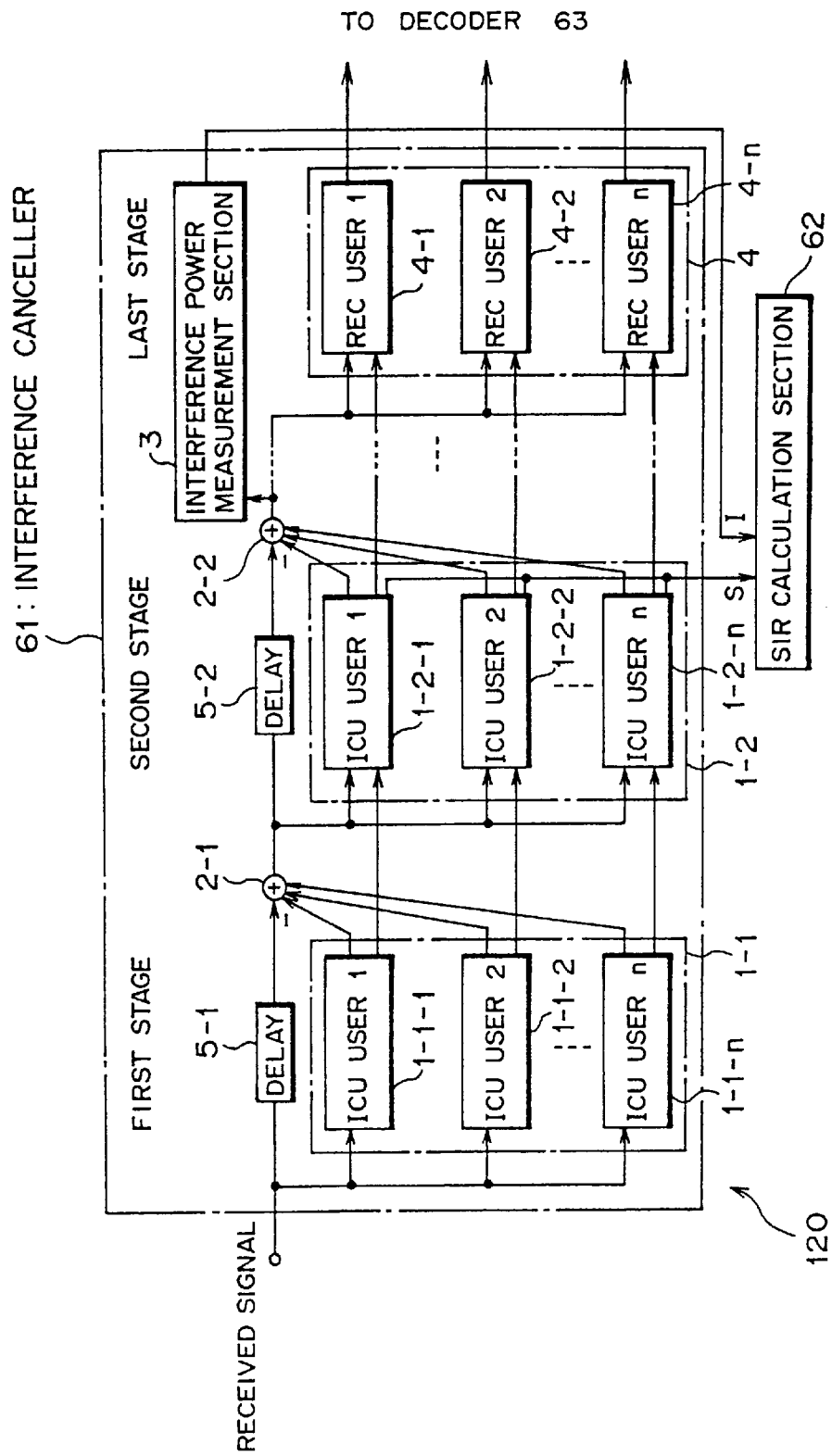
FIG. 2 is a block diagram showing an interference canceller and a signal to interference power ratio calculation section of the signal to interference power ratio measuring apparatus of the first embodiment of the present invention.

FIG. 2 shows in block diagram the interference canceller 61 and the SIR calculation section 62 which form the signal to interference power ratio measuring apparatus 120 according to the first embodiment. Referring to FIG. 2, the interference canceller 61 shown includes interference replica production units 1-1 to 1-n, subtractors 2-1 to 2-n, an interference power measurement section 3, a receiver 4, and delay circuits 5-1 to 5-n.

The interference replica production unit 1-i, subtractor 2-i and delay circuit 5-i (i=natural number from 1 to n) construct an ith stage calculation unit, and consequently, totalling n stage calculation units are constructed while a last stage calculation unit is constructed from the receiver 4. It is to be noted that, in FIG. 2, the interference replica production units 1-3 to 1-n, subtractors 2-3 to 2-n and delay circuits 5-3 to 5-n are omitted for simplified illustration.

The interference replica production unit (interference replica signal production section) 1-i first performs de-spread processing for an input signal originating from a received signal and then performs temporary decision of an information symbol from the input signal, whereafter it performs spread processing again and outputs a result of the spread processing as interference replica signals. Such interference replica production units 1-1 to 1-n are provided in tandem.

In particular, adjacent ones of the interference replica production units 1-i (ith and i+1th stage interference replica production units) are connected to each other so as to form a multi-stage type interference canceller. Further, symbol replica signals are outputted from each of the interference replica production units 1-i (except interference replica production unit 1-n) to a next stage interference replica production unit 1-(i+1), and symbol replica signals from the interference replica production unit 1-n are outputted to the receiver 4.

It is to be noted that each of the interference replica production units 1-i has a number of units (ICU users) 1-1-1 to 1-1-n, ..., 1-n-l to 1-n-n (hereinafter referred to as 1-1-i, ..., 1-n-i) equal to the number of users (number of mobile stations 50) which can be accommodated in the base station 60. The interference replica signals outputted from each interference replica production unit 1-i represent a sum total of interference replica signals from the units corresponding to the individual users. A detailed construction of the interference replica production units 1-i is hereinafter described in detail with reference to FIG. 3.

The subtractor 2-i subtracts interference replica signals produced by the interference replica production unit 1-i from an original received signal. More particularly, the subtractor 2-i subtracts interference replica signals from the interference replica production unit 1-i from an output of the delay circuit 5-i which will be hereinafter described, and is provided on the output side of the interference replica production unit 1-i. An output of the subtractor 2-i is outputted as a residual signal (signal originating from a received signal) to a next stage.

The interference power measurement section (interference power detection section) 3 detects interference powers (I) from an output of the subtractor 2-i. In the first embodiment, the interference power measurement section 3 detects interference powers (I) from a residual signal outputted from the second stage subtractor 2-2. The interference powers (I) are outputted to the SIR calculation section 62.

The receiver (reception section) 4 receives, as input signals thereto, outputs of the subtractor 2-n provided on the output side of the nth stage (last stage) interference replica production unit 1-n and performs de-spread processing for the input signals. More particularly, the receiver 4 performs Viterbi decoding of the input signals using a signal after RAKE composition. Further, the receiver 4 is provided as the last stage of the interference canceller 61 as described above, and also the receiver 4 includes a number of reception units (Rec users) 4-1 to 4-n equal to the number of the users.

The delay circuit (Delay) 5-i delays an input signal thereto originating from a received signal by a predetermined time and has an output connected to the subtractor 2-i described above. The subtractor 2-i thus subtracts the delay signal from an interference replica signal as described above.

In short, a residual signal from the subtractor 2-i is a difference of all signal components of all of the users from a received signal and corresponds to an interference component signal.

Here, a construction of the units 1-1-i, ..., 1-n-i for the individual users shown in FIG. 2 is described in detail below in connection with the unit 1-2-i. In particular, the unit 1-2-i includes, for example, as shown in FIG. 3, an de-spread processing section 10, an adder 11, a channel estimation circuit 12, a multiplier 13, a RAKE composition section 14, a hard decision circuit 15, another multiplier 16, a subtractor 17, a re-spread processing section 18, a signal composition section 19 and a received power measurement section 20.

Figure 3:
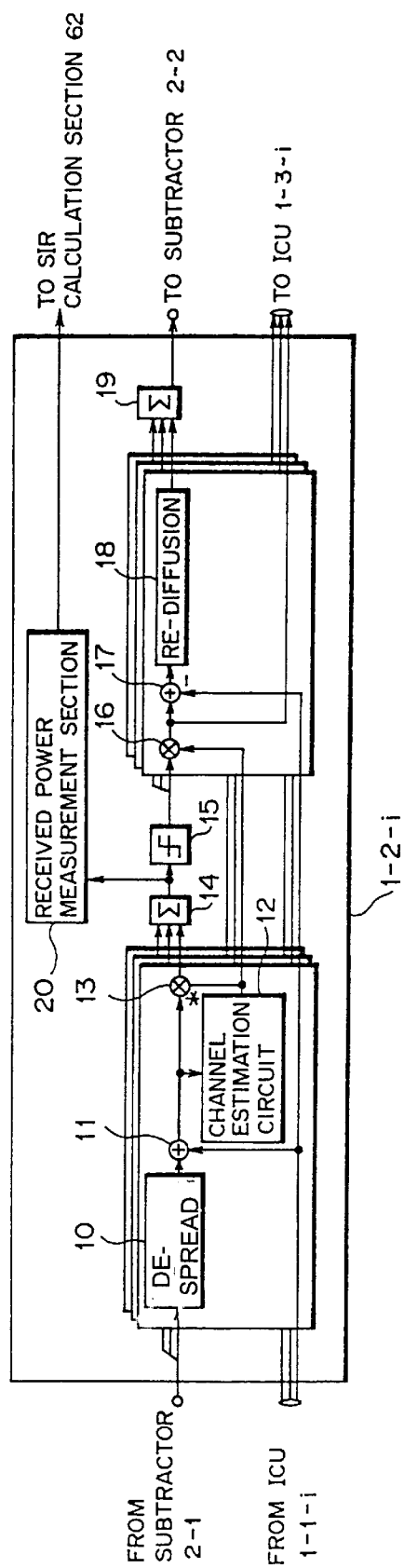
FIG. 3 is a block diagram showing an internal construction of an interference replica signal production section of the interference canceller shown in FIG. 2.

It is to be noted that processing of the de-spread processing section 10, adder 11, channel estimation circuit 12 and multiplier 13 and processing of the multiplier 16, subtractor 17 and re-spread processing section 18 mentioned above are performed for a plurality of delayed waves, and to this end, a number of elements equal to the number of delayed waves are provided for each of the components (in FIG. 3, 3 units corresponding to three delayed waves are individually provided). The number of such units to be installed can be suitably varied in accordance with requirements for measurement.

Further, while the interference replica production unit 1-i shown in FIG. 3 indicates one of the units 1-2-1 to 1-2-n for a plurality of users provided in the second stage interference replica production unit 1-2, for simplified description, the following detailed description is given of the interference replica production unit 1-2 as such interference replica production unit 1-i.

Each of the de-spread processing sections 10 performs de-spread processing for an input signal originating from a received signal. Particularly, the de-spread processing section 10 performs inverse spread processing for a signal (residual signal) outputted from the first stage interference replica production unit 1-1 and received through the subtractor 2-1. In this instance, the de-spread processing section 10 converts the received residual signal into a symbol rate.

Each adder 11 adds a signal obtained by de-spread processing by the corresponding de-spread processing section 10 and a signal (symbol replica signal) outputted from the interference replica production unit 1-1 in the preceding stage.

Each channel estimation circuit 12 estimates a transmission line channel using a pilot symbol of a signal inputted thereto. Particularly, the channel estimation circuit 12 performs such estimation using only a pilot symbol at a leading end of a slot. Consequently, the first and second stage units 1-1-i and 1-2-i yield a processing delay of only several symbols, and the processing delay until an SIR is measured can be minimized.

It is possible otherwise to perform transmission line channel estimation with a higher degree of accuracy using a pilot symbol at a trailing end of the slot in the third and following stages so that characteristic deterioration of the interference canceller 61 itself may be suppressed.

Each multiplier 13 multiplies an output of the corresponding adder 11 by a complex conjugate of an estimated channel value from the corresponding channel estimation circuit 12.

The RAKE composition section 14 performs maximum ratio composition (composition processing by which a maximum SIR is obtained) from delayed wave outputs of the multipliers 13 described above. The hard decision circuit 15 performs temporary decision of an information symbol. More particularly, the hard decision circuit 15 decides rough positions of signals of the interference replica production unit 1-2 based on a signal obtained by maximum ratio composition by the RAKE composition section 14.

The received power measurement section (signal power detection section) 20 detects received powers (S) based on a signal obtained by performing de-spread processing for signals originating from a received signal. More particularly, the received power measurement section 20 detects received powers (S) based on an de-spread processed signal obtained in an intermediate processing stage (in the first embodiment, in the second stage) of an arbitrary one of the interference replica production units 1-i. The received powers (S) thus detected are outputted to the SIR calculation section 62.

In short, since received powers (S) detected by the received power measurement section 20 and interference powers (I) detected by the interference power measurement section 3 described above can be detected separately from each other, SIR values can be calculated with a high degree of accuracy by the SIR calculation section 62.

It is to be noted that each of the received powers (S) described above are detected by calculating a square mean of an output of the RAKE composition section 14 so that a significant deterioration in accuracy does not occur even if a data symbol interval is used for SIR measurement. Accordingly, not only a high degree of accuracy of an SIR can be maintained even in a fast fading environment, but also SIR measurement can be performed with a smaller amount of delay, and as a result, the transmission power control characteristic can be improved.

Further, an output (temporary decision value) of the hard decision circuit 15 is divided at the multipliers 16 so that it may thereafter be processed along paths for the individual delayed waves, and each of the multipliers 16 shown in FIG. 3 multiplies the output of the hard decision circuit 15 by an output (estimated channel value) of the corresponding channel estimation circuit 12. An output of the multiplier 16 is connected to the corresponding subtractor 17 described below. Further, the outputs of the multipliers 16 are outputted also as symbol replica signals (hard decision results), which have been decomposed for the individual paths prior to re-diffusion, to the unit 1-3-i in the next stage corresponding to the unit 1-2-i. Each subtractor 17 subtracts, from an output of the corresponding multiplier 16, a corresponding symbol replica signal produced by the preceding stage unit 1-1-i corresponding to the unit 1-2-i.

Each re-spread processing section 18 performs re-spread processing for an output of the corresponding subtractor 17. The signal composition section 19 performs composition of outputs of the re-spread processing sections 18. An output of the signal composition section 19 is outputted as an interference replica signal to the subtractor 2-2.

Consequently, the subtractor 2-2 subtracts interference replica signals from the individual users from an output of the delay circuit 5-2 and outputs a result of the subtraction to the next stage, that is, to the third stage.

Accordingly, in the first embodiment, received powers (S) and interference powers (I) can be separated with certainty from a received signal by repetitively subtracting interference replica signals produced from input signals originating from the received signal from the received signal in each stage. Further, since the transmission powers of the mobile stations 50 of the individual users can be controlled so that the measured SIR values may be the predetermined value, a necessary line quality can be maintained.

It is to be noted that the units 1-1-i, 1-3-i, . . . , 1-n-i in the other stages have a basically similar construction to that of the unit 1-2-i except that they do not include the received power measurement section 20. Further, the adder 11 and the subtractor 17 need not be provided in the first stage interference replica production units 1-1 since the first stage interference replica production units 1-1 does not receive symbol replica signals as inputs thereto. However, where the adder 11 and the subtractor 17 are provided otherwise, they add and subtract "0".

Further, while, in the first embodiment, the second stage unit 1-2-i measures received powers, the received power measurement processing may alternatively be performed by the first stage unit 1-1-i.

In the radio communication system 110 to which the SIR measuring apparatus 120 according to the first embodiment of the present invention having the construction described above is applied, when a signal from each mobile station 50 is received, the received signal is inputted to the delay circuit 5-1 and the first stage interference replica production unit 1-1 in the interference canceller 61 as seen in FIGS. 1 and 2.

Thereafter, an interference replica signal and a symbol replica signal for each user are produced by the unit 1-1-i of the first stage interference replica production unit 1-1, and all of the interference replica signals produced for the individual users are outputted to the subtractor 2-1. Then, the interference replica signals are subtracted from an output of the delay circuit 5-1 by the subtractor 2-1, and a result of the subtraction processing is outputted as a residual signal from the subtractor 2-1 to the units 1-2-i of the second stage interference replica production units 1-2. Meanwhile, also the symbol replica signals from the individual units 1-1-i are outputted to corresponding ones of the units 1-2-i of the second stage interference replica production unit 1-2.

Further, in the second stage, when the residual signal from the subtractor 2-1 in the preceding stage is inputted, interference replica signals and symbol replica signals are produced similarly by the individual units 1-2-i of the interference replica production unit 1-2, and received powers (S) of the individual users are detected by the received power measurement sections 20.

The processing of the interference replica production units 1-2 in this instance is described below with reference to FIG. 3.

In particular, in the unit 1-2-i, the de-spread processing sections 10 perform de-spread processing for signals (interference replica signals) from the first stage interference replica production unit 1-1 obtained through the subtractor 2-1, and the adders 11 add the thus de-spread processed signals and symbol replica signals from the unit 1-1-i corresponding to the unit 1-2-i, whereafter the channel estimation circuits 12 estimates transmission line channels.

Thereafter, the multipliers 13 multiply outputs of the adders 11 by a complex conjugate to the estimated channel value, and the RAKE composition section 14 performs maximum ratio composition. Then, the received power measurement section 20 measures received powers (S) from the maximum ratio composition output of the RAKE composition section 14 by square mean calculation and outputs the thus measured received powers (S) to the SIR calculation section 62.

In the meantime, the output of the RAKE composition section 14 is temporarily decided by the hard decision circuit 15, and the temporarily decided signal and the estimated channel values from the channel estimation circuit 12 are multiplied by the multipliers 16. Then, resulting values are outputted as symbol replica signals to the third stage interference replica production unit 1-3.

Further, the subtractors 17 subtract the symbol replica signals from the first stage from the outputs of the multipliers 16, and the re-spread processing sections 18 perform re-spread processing for outputs of the subtractors 17. Then, outputs of the re-spread processing sections 18 are composed by the signal composition section 19 and outputted as an interference replica signal to the subtractor 2-2.

Thereafter, the subtractor 2-2 receives the interference replica signal from the subtractor 2-1 after it is delayed by the delay circuit 5-2 and receives interference replica signals from the units 1-2-1 to 1-2-n corresponding to all users. Then, the subtractors 2-2 subtracts a sum total of the interference replica signals from the units 1-2-1 to 1-2-n from the interference replica signal from the subtractor 2-1 and outputs a resulting value as a residual signal to the third stage interference replica production unit 1-3.

Further, the interference power measurement section 3 detects interference powers (I) based on the residual signal outputted from the subtractor 2-2 and outputs the interference powers (I) to the SIR calculation section 62. Thereafter, the SIR calculation section 62 measures SI ratio information of the individual users from the received powers (S) from the received power measurement section 20 and the interference powers (I) from the interference power measurement section 3.

The comparison circuit 65 compares the SIR values measured by the SIR calculation section 62 described above with an aimed SIR value and transmits a result of the comparison through the transmission frame production section 64 to effect transmission power control of each mobile station 50.

Further, also in each of the third and following stages, similarly as in the stage described above, interference replica signals produced from input signals originating from the received signal are repetitively subtracted from the received signal. Then, the receiver 4 as the last stage performs de-spread processing for interference replica signals from the last stage 1-n, and the decoder 63 decodes signals of the individual users from the mobile stations 50.

Here, a detailed corroborative example (simulation) of the function of the SIR measuring apparatus 120 of the first embodiment described above is described. In the simulation, closed loop control wherein the transmission powers of the mobile stations 50 are controlled with a step of a slot period ±1 dB so that the measured SIR values may become equal to the aimed SIR set in advance is performed. It is to be noted that the simulation is performed based on such various elements as illustrated in FIG. 4, and here, the number of users is set to 32.

Further, in a system of the simulation, a multi-stage type interference canceller of three stages is used, and two interference replica production units 1-1 and 1-2 are connected in tandem while a receiver 4 is provided in the third stage (last stage) next to the stage of the interference replica production unit 1-2.

Further, SIR values are measured based on received powers (S: signal power information) obtained by averaging signal powers after RAKE composition by the second stage interference replica production unit 1-2 over one slot and interference powers (I: interference power information) obtained by averaging a residual signal similarly over one slot.

Furthermore, since channel estimation by the interference replica production unit 1-i is performed using a pilot symbol at a leading end of a slot, a processing delay of only several symbols is provided up to the second stage, but since the receiver 4 in the last stage performs channel estimation with a high degree of accuracy using also a pilot symbol at a trailing end of the slot, a delay longer than 1 slot is caused.

In particular, when a received power (S) is measured by the interference replica production unit 1-2 in the second stage, a delay (TPC delay) caused by transmission power control is 1 Tp (Tp: pilot period), and when the received power (S) is measured by the receiver 4 in the last stage, the TPC delay is 2 Tp.

Figure 5:
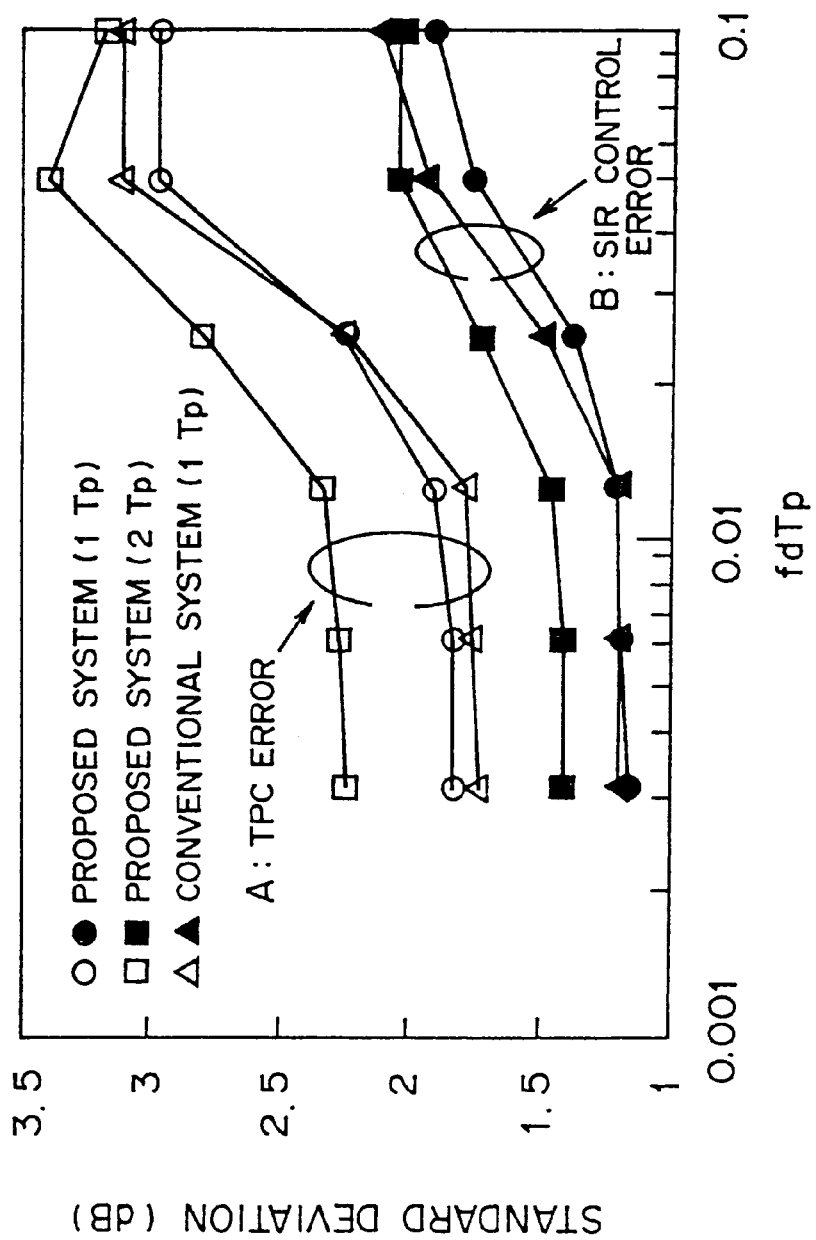
FIG. 5 is a diagram illustrating an example of simulation performed by the signal to interference power ratio measuring apparatus shown in FIG. 1.
Figure 10:
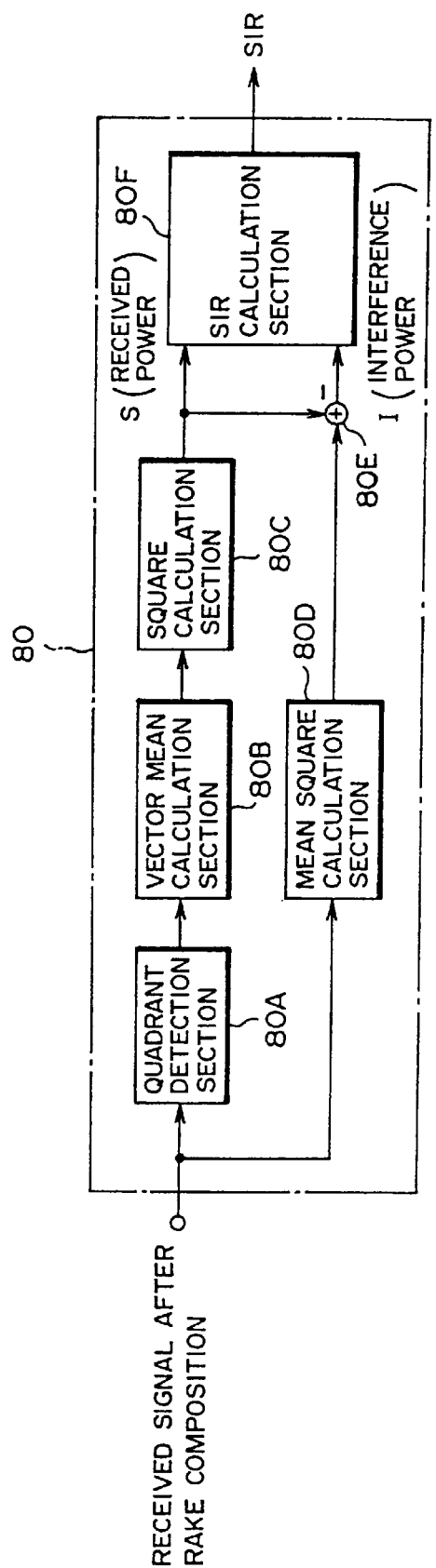
FIG. 10 is a block diagram showing a construction of an SIR measuring apparatus which measures a signal to interference power ratio using a signal after RAKE composition.

FIG. 5 illustrates TPC errors and SIR control errors with respect to the normalized fading frequency (fdTp) and indicates characteristics ("○", "●") where the TPC delay is 1 Tp and characteristics ("□", "■") where the TPC delay is 2 Tp when the SIR measuring apparatus 120 of the construction of the third stage shown in FIG. 2 is used and characteristics ("□", "Δ") when the SIR measurement technique described hereinabove with reference to FIG. 10 is used.

It is to be noted that the TPC errors (refer to an arrow mark A of FIG. 5) denote standard deviations of the received powers from an ideal TPC, and the SIR control errors (refer to another arrow mark B of FIG. 5) denote standard deviations of the received SIR from an aimed SIR.

Where the SIR measurement technique described hereinabove with reference to FIG. 10 was employed, an SIR was measured using a mean value of a received signal after RAKE composition by the second stage interference replica production unit 1-2 over one slot interval as a received power (S) and using a diffusion as an interference power (I). Further, for the individual cases, calculation was performed setting the aimed SIR so that the average error rate might be 1×10-3 when fdTp is 0.05.

As a result, it was found that the TPC error and the SIR control error exhibit superior values where the SIR measuring apparatus 120 having the 3 stage construction shown in FIG. 3 is used and the TPC delay is set to 1 Tp ("○", "●"), and consequently, it can be said that the conditions in this instance can be applied to a fast fading environment. Accordingly, from this result of the simulation, it is apparent that reduction in transmission power can be achieved by decreasing the delay time.

In this manner, according to the first embodiment of the present invention, since interference powers (I) are detected based on signals obtained by subtracting, from a received signal, interference replica signals produced by the interference canceller 61 for removing interference between spreading codes while received powers (S) are detected based on signals obtained by performing de-spread processing for signals originating from the received signal and consequently the interference powers (I) and the received powers (S) can be detected separately from each other, there is an advantage that the accuracy in measurement of an SIR can be improved.

Further, according to the present invention, since the accuracy of SIR values is improved by calculating the SIR values from interference powers (I) and received power (S) obtained from outputs of the interference canceller 61, there is an advantage that the transmission powers of the mobile stations 50 can be controlled using the SIR values and, also in a noise environment or an inter-station interference condition when a large number of users communicate at a time, improvement in transmission power control characteristic can be achieved while maintaining a necessary line quality.

Furthermore, according to the present invention, since received powers (S) can be detected based on signals, for which de-spread processing has been performed, obtained in an intermediate processing stage of the interference replica production units 1-i, even if a data symbol interval is used for SIR measurement, a significant deterioration in accuracy does not occur, and even in a fast fading environment, a high degree of accuracy in measurement of an SIR can be maintained. Accordingly, SIR measurement can be performed with a reduced amount of delay, and as a result, the transmission power control can follow up such a fast fading environment as described above.

b. Second Embodiment of the Invention

Figure 6:
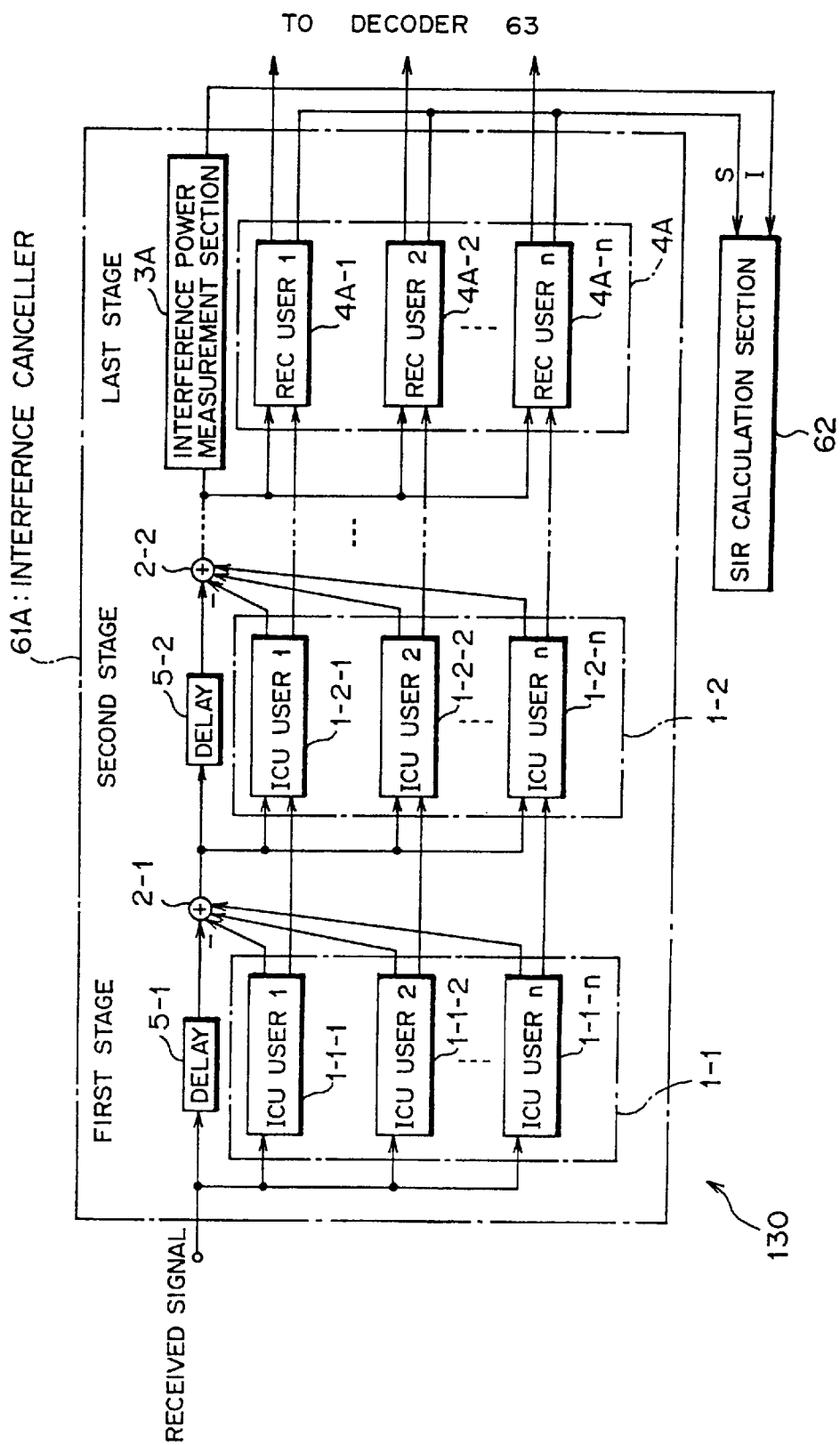
FIG. 6 is a block diagram showing an interference canceller and a signal to interference power ratio calculation section of a signal to interference power ratio measuring apparatus according to a second preferred embodiment of the present invention.

FIG. 6 shows in block diagram a construction of a signal to interference power ratio measuring apparatus according to a second preferred embodiment of the present invention. As the signal to interference power ratio measuring apparatus (SIR measuring apparatus) 130 shown in FIG. 6 includes an interference canceller 61A and an SIR calculation section 62.

The interference canceller 61A includes, similarly as in the first embodiment described hereinabove, interference replica production units 1-i, subtractors 2-i, an interference power measurement section 3A, a receiver 4A and delay circuits 5-i. In particular, also each of the interference replica production units 1-i in the present second embodiment includes a number of, for example, such units 1-1-i, . . . , 1-n-i as shown in FIG. 7 equal to the number of users which can be accommodated in the base station 60.

Figure 7:
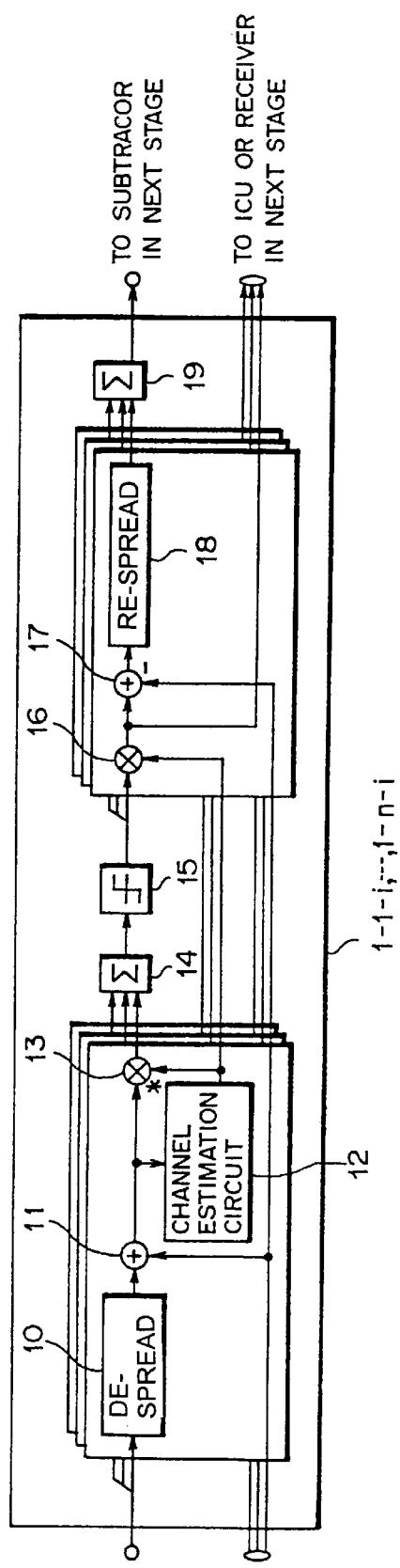
FIG. 7 is a block diagram showing a construction of an interference replica signal production section of the signal to interference power ratio measuring apparatus according to the second embodiment of the present invention.

The units 1-1-i, . . . , 1-n-i shown in FIG. 7 are similar in construction and function to the interference replica production units 1-2 shown in FIG. 3 except that they do not include the received power measurement section 20 which is provided between the RAKE composition section 14 and the hard decision circuit 15 in the interference replica production unit 1-2 of FIG. 3.

The interference power measurement section 3A detects interference power information (I) from outputs of the subtractor 2-i. Particularly, in the interference canceller 61A shown in FIG. 6, the interference power measurement section 3A detects interference power information from an output of the subtractor 2-n in the nth stage (last stage).

The receiver (reception section) 4A receives, as input signals thereto, outputs (residual signals) of the subtractor 2-n provided on the output side of the interference replica production unit 1-n in the nth stage (last stage) and performs de-spread processing for the residual signals, and is provided as the last stage of the interference canceller 61A. Outputs of the receiver 4A are outputted to and decoded by the decoder 63.

Figure 8:
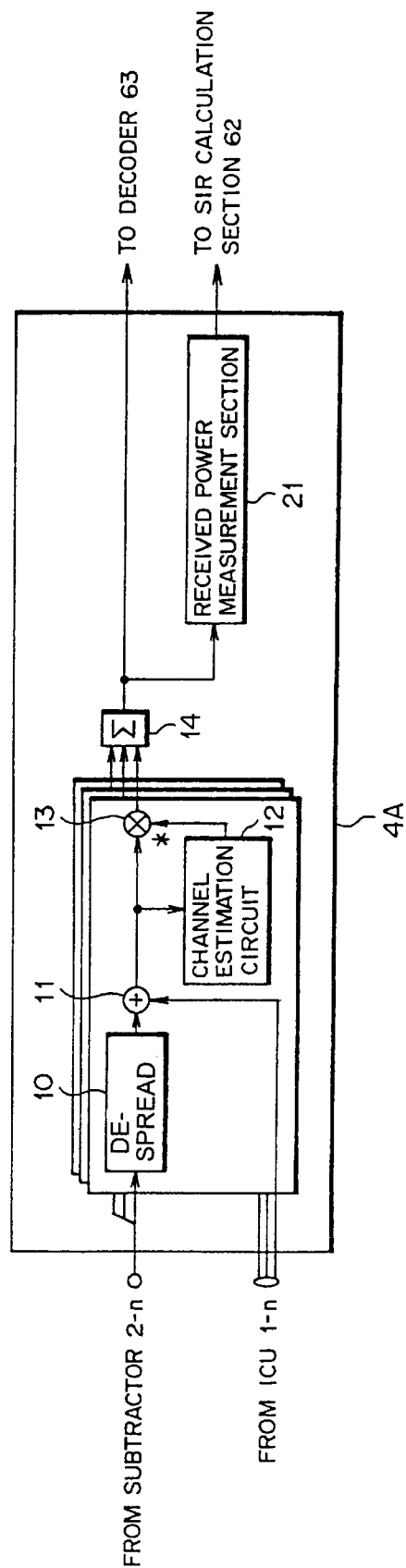
FIG. 8 is a block diagram showing an internal construction of a reception section of the signal to interference power ratio measuring apparatus according to the second embodiment of the present invention.
Figure 9:
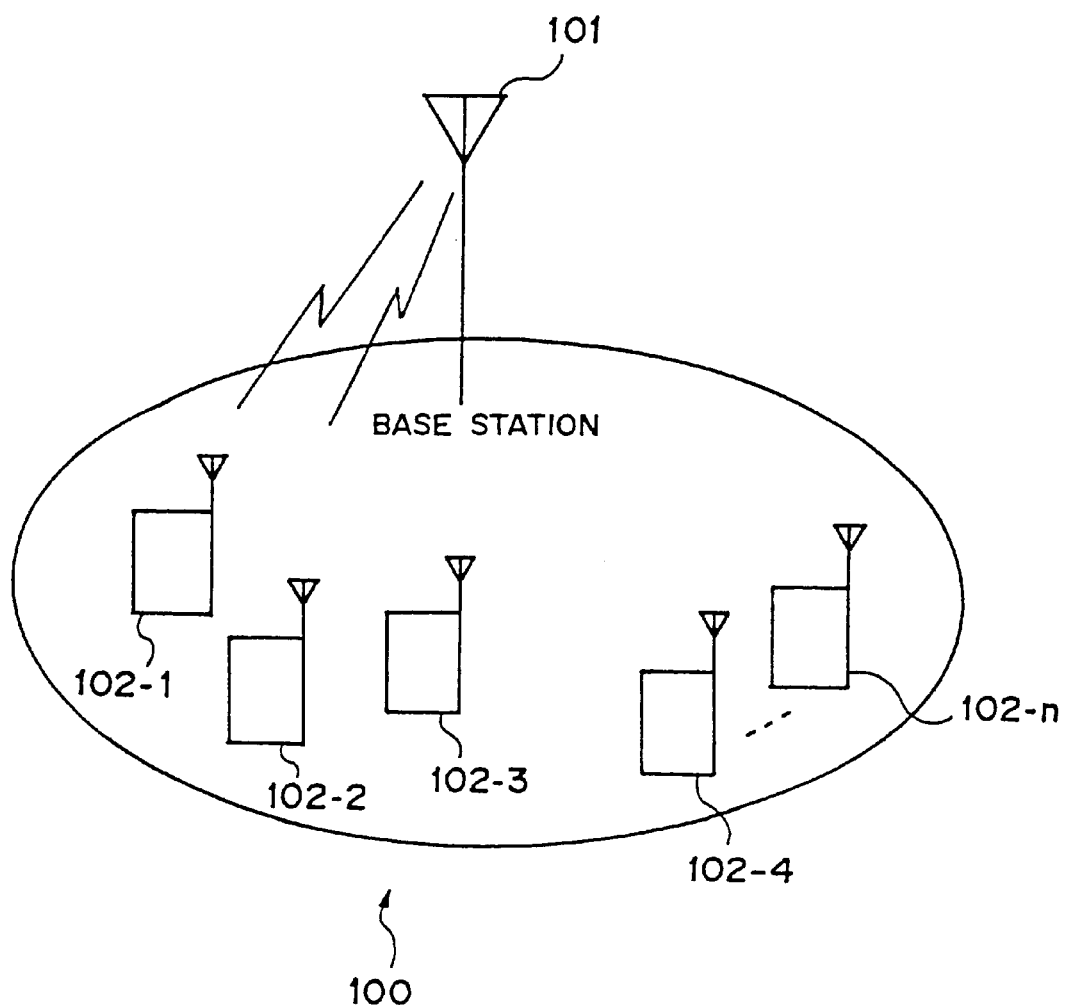
FIG. 9 is a schematic illustration showing a radio communication system to which an ordinary DS/CDMA communication system is applied.

Also the receiver 4A includes a number of reception units 4A-1 to 4A-n (Rec users) equal to the number of users. Each of the reception units 4A-1 to 4A-n includes, as shown in FIG. 8, de-spread processing sections 10, adders 11, channel estimation circuits 12, multipliers 13, a RAKE composition section 14 and a received power measurement section 21. It is to be noted that description of common or similar components in the second embodiment to those in the first embodiment is omitted here to avoid redundancy.

The received power measurement section (signal power detection section) 21 detects received powers (S) based on signals, for which de-spread processing has been performed, obtained in the receiver 4A and particularly detects received powers (S) from an output of the RAKE composition section 14. In particular, in the second embodiment, the received power measurement section 21 is provided in the receiver 4A, and received powers (S) detected by the received power measurement section 21 are outputted to the SIR calculation section 62.

More particularly, in the interference replica production units 1-i of the interference canceller 61A, as the stages are passed successively, signal components are decomposed from a residual signal (the interference power I decreases), and consequently, received signal components can be detected with a higher degree of accuracy (the signal power S increases). Accordingly, from the interference canceller 61A in the second embodiment, a very accurate interference signal component can be obtained.

Consequently, in the second embodiment, the interference power measurement section 3A measures interference powers (I) and measures received powers (S) from the received power measurement section 21 of the receiver 4A, and then measures SI ratios from the interference powers and the received powers.

In the SIR measuring apparatus 130 according to the second embodiment of the present invention having the construction described above, if signals from the mobile stations 50 are received, then interference replica signals and symbol replica signals are produced from the received signals by the interference replica production units 1-i, delay circuits 5-i and subtractors 2-i installed in the ith stages in the interference canceller 61A.

Then, interference powers (I) are detected from interference replica signals outputted from the nth stage by the interference power measurement section 3A in the last stage, and received powers (S) are detected from the interference replica signals and the symbol replica signals described above by the receiver 4A. It is to be noted that the other outputs of the receiver 4A are outputted to the decoder 63 so that the signals from the individual users are decoded.

Thereafter, the interference powers (I) and the received powers (S) detected by the interference canceller 61A are outputted to the SIR calculation section 62, by which SI ratios of the individual users are measured.

In this manner, with the second embodiment of the present invention, since received powers (S) and interference powers (I) can be separated with certainty from a received signal by repeating the processing of detecting signals of all users from the received signal and subtracting all of the thus produced interference replica signals from the received signal, the SIR measurement accuracy can be improved remarkably, and consequently, the accuracy in transmission power control for the mobile stations 50 can be improved remarkably.

c. Others

While the numbers of stages of the interference canceller 61 or 61A and the number (n) of users in the embodiments described above in detail are made equal to each other, the numbers need not necessarily be made equal to each other, and they may naturally be varied in accordance with conditions for installation and so forth.

Further, while the embodiments described in detail above include a parallel type interference canceller which processes signals of a plurality of users simultaneously, the present invention can be applied also to an interference canceller of the serial type which performs interference removing processing serially in order beginning with a user which exhibits a comparatively high reception level or an interference canceller of the type which includes a combination of interference cancellers of the serial type and the parallel type.

The present invention is not limited to the specifically described embodiment, and variations and modifications may be made without departing from the scope of the present invention.

What is claimed is:

1. A signal to interference power ratio measuring apparatus for an apparatus which processes a received signal received based on a CDMA communication system, comprising:

an interference replica signals production section for despreading input signals originating from the received signal, performing temporary decision of information symbols regarding the input signals, re-spreading the information symbols decided temporarily and outputting re-spreading signals as interference replica signals:

a subtractor for subtracting the interference replica signals from the received signal;

an interference power detection section for detecting interference power information from outputs of the subtractor;

a signal power detection section for detecting signal power information based on the signals which originate from the received signal and which has been despreaded; and a signal to interference power ratio calculation section for calculating signal to interference power ratios from the interference power information and the signal power information.

2. A signal and interference power measuring apparatus for an apparatus which processes a received signal received based on a CDMA communication system, comprising:

an interference replica signals production section for despreading input signals originating from the received signal, performing temporary decision of information symbols regarding the input signals, re-spreading the information symbols decided temporarily and outputting re-spreading signals as interference replica signals;

a subtractor for subtracting the interference replica signals from the received signal;

an interference power detection section for detecting interference power information from outputs of the subtractor; and a signal power detection section for detecting signal power information based on the signals which originate from the received signal and which has been despreaded.

3. An interference power measuring apparatus for an apparatus which processes a received signal received based on a CDMA communication system, comprising:

an interference replica signals production section for despreading input signals originating from the received signal, performing temporary decision of information symbols regarding the input signals, re-spreading the information symbols decided temporarily and outputting re-spreading signals as interference replica signals;

a subtractor for subtracting the interference replica signals from the received signal; and an interference power detection section for detecting interference power information from outputs of the subtractor.

4. A signal power measuring apparatus for an apparatus which processes a received signal received based on a CDMA communication system, comprising:

an interference replica signals production section for despreading input signals originating from the received signal, performing temporary decision of information symbols regarding the input signals, re-spreading the information symbols decided temporarily and outputting respreading signals as interference replica signals; and a signal power detection section for detecting signal power information based on the signals which originate from the received signal and which has been despreaded.

* * * * *